United States Patent [19]

Christensen

[11] Patent Number: 4,588,163
[45] Date of Patent: May 13, 1986

[54] VALVE STEM TRAVEL LIMITING APPARATUS

[75] Inventor: Norman B. Christensen, Sarasota, Fla.

[73] Assignee: Dana Corporation, Toledo, Ohio

[21] Appl. No.: 474,007

[22] Filed: Mar. 10, 1983

[51] Int. Cl.[4] ............................................. F16K 51/00
[52] U.S. Cl. ...................................... 251/285; 137/538; 137/540; 292/307 R; 411/237; 411/254; 411/272; 411/335
[58] Field of Search ............... 411/272, 237, 238, 277, 411/278, 333, 334, 335, 254, 276, 280, 910; 292/307 B, 307 R, 316; 251/205, 285; 137/538, 540

[56] References Cited

U.S. PATENT DOCUMENTS

| 89,066 | 4/1869 | Nichols | 411/237 |
| 205,712 | 7/1878 | Whitmarsh | 411/272 |
| 380,926 | 4/1888 | Piper | 411/335 |
| 701,530 | 6/1902 | Alger | 411/237 |
| 1,091,959 | 3/1914 | Pybus | 411/254 |
| 1,151,632 | 8/1915 | Wall | 411/254 X |
| 1,346,730 | 7/1920 | Viebrock | 411/237 |
| 1,991,052 | 2/1935 | Derby | 251/285 |
| 2,285,080 | 6/1942 | Berge | 411/237 |
| 2,449,846 | 9/1948 | Gilman | 411/237 |
| 2,655,930 | 10/1953 | Towler et al. | 137/538 X |
| 2,677,407 | 5/1954 | McKenzie | 411/272 |
| 3,272,218 | 9/1966 | Johnson | 137/540 X |
| 3,486,734 | 12/1969 | Works et al. | 251/285 |
| 3,616,828 | 11/1971 | Jessmore | 411/272 |
| 4,182,366 | 1/1980 | Boehringer | 137/514 X |
| 4,236,561 | 12/1980 | Monticelli | 411/280 |
| 4,283,041 | 8/1981 | Kujawski | 251/205 |

FOREIGN PATENT DOCUMENTS

| 697855 | 1/1931 | France | 411/273 |
| 5789 | of 1908 | United Kingdom | 251/285 |
| 1411498 | 10/1975 | United Kingdom | 137/538 |

Primary Examiner—Kenneth J. Dorner
Assistant Examiner—Rodney M. Lindsey
Attorney, Agent, or Firm—Frank B. McDonald

[57] ABSTRACT

A stem travel limiting apparatus provides a relatively tamper proof limit setting device for an adjustable valve stem. In a preferred embodiment, an internally threaded annular collar is positioned about an externally matingly threaded stem, the collar having a spaced gap in its annular body. A locking ring is positioned over the collar, and is of a size relative to the collar to develop sufficient force over the collar to partially close the gap and to force the threads of the stem and collar into distortion. The apparatus is positioned along the stem during assembly of a control valve to thereby provide a limit to a manually adjustable setting of the control valve.

4 Claims, 6 Drawing Figures

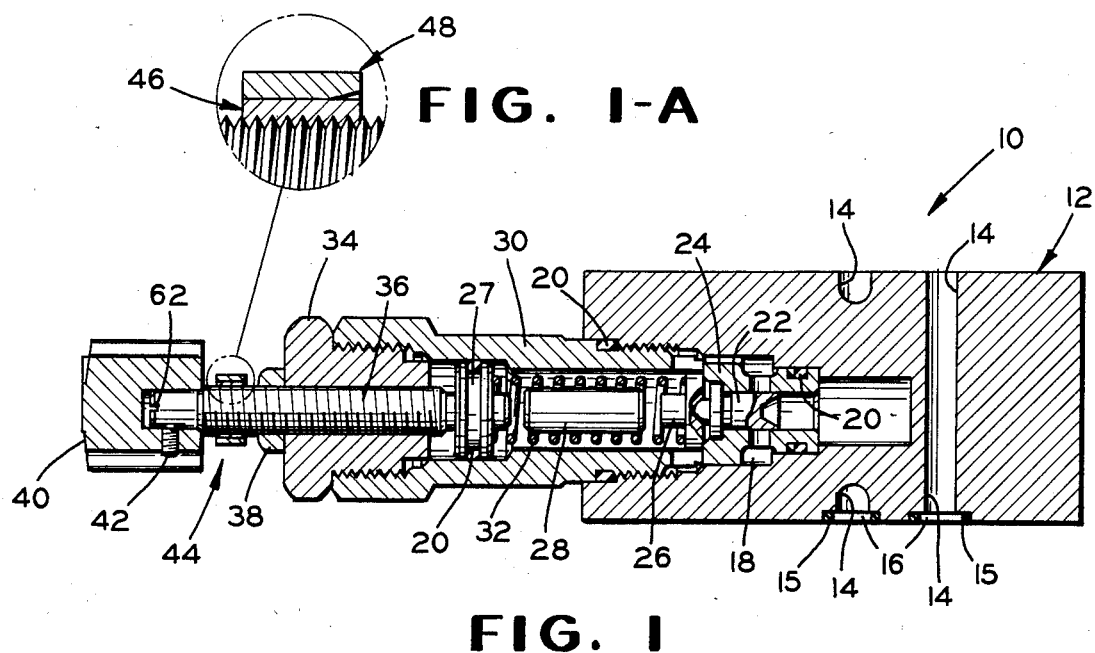
FIG. I-A
FIG. I
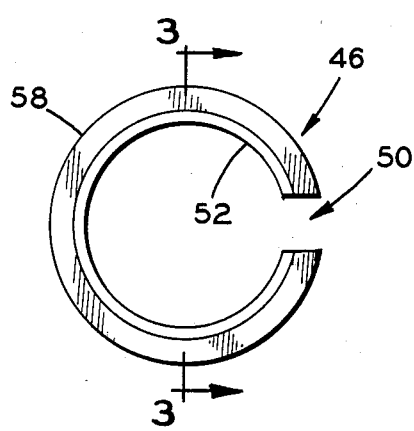
FIG. 2
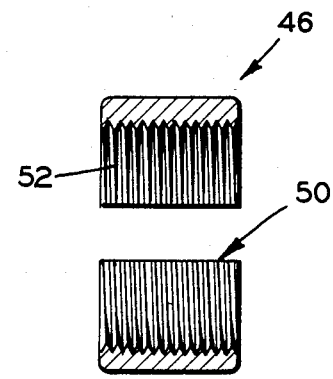
FIG. 3
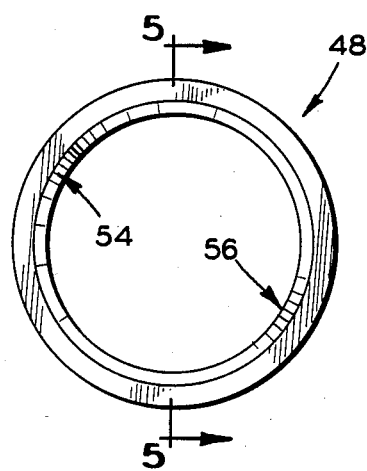
FIG. 4
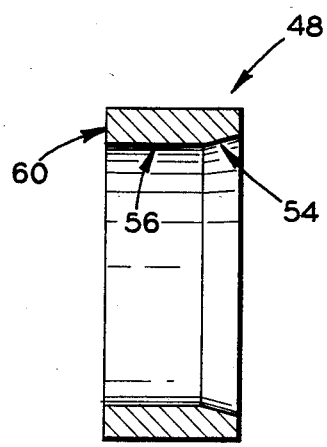
FIG. 5

4,588,163

VALVE STEM TRAVEL LIMITING APPARATUS

BACKGROUND OF THE INVENTION

This invention relates to pressure control valves, and particularly to devices which provide pressure relief limits. More particularly, the invention relates to devices for limiting the valve stem travel of a pressure control valve for insuring against overpressuring a hydraulic fluid system.

Numerous devices have been utilized for the purpose of limiting pressure adjustments via threaded valve stems. For example, one such device provides for a sleeve positioned over a threaded stem wherein the stem is adjusted during assembly and testing of the valve to a desired position, and the sleeve is then crimped to the stem to insure against relative movement thereafter between stem and sleeve. This device has been unsatisfactory to the extent that the crimp has occasionally failed and permitted movement between stem and sleeve. Other devices have involved the use of pins which have been secured in holes in the stem. However, the drilling of holes in the stems has required transfers from a work station to a drill press for drilling of the stems. Such extra handling is undesirable in the mass manufacture of valve assemblies.

Thus, a relatively simple, inexpensive apparatus is desired which requires no extra handling and which is very difficult to alter once assembled. Such an apparatus is particularly desirable for hydraulic applications wherein excess pressure may cause mechanical damage or bodily harm.

SUMMARY OF THE INVENTION

The apparatus disclosed herein is virtually tamper proof under normal operating procedures, and does not require extra or special handling of valve assemblies during mass production thereof. Moreover, the apparatus is simple and inexpensive to install.

In a preferred embodiment, the apparatus is installed over a valve stem having a threaded external surface. The apparatus includes an internally threaded annular collar which is positioned over the stem, the collar having a spaced gap in its annular body. A locking ring is positioned over the collar, and is sized to exert a force over the collar sufficient to partially close the gap and to force the threads of the stem and collar into distortion. In a preferred form, the locking ring includes an internally beveled portion, and is of a relative soft steel which yields without breakage.

BRIEF DESCRIPTION OF THE DRAWINGS

FIG. 1 is a cross-sectional view of a pressure control valve assembly which incorporates a preferred embodiment of the present invention;

FIG. 1-A is an enlarged cross-sectional view of a portion of the assembly shown in FIG. 1;

FIG. 2 is a cross-sectional face view of a threaded annular collar as utilized in a preferred embodiment of this invention;

FIG. 3 is a cross-sectional side view of the collar as taken along lines 3—3 of FIG. 2;

FIG. 4 is a full face view of a locking ring as utilized in a preferred embodiment of the present invention; and FIG. 5 is a cross-sectional view of the locking ring as taken along lines 5—5 of FIG. 4.

DETAILED DESCRIPTION OF A PREFERRED EMBODIMENT

Referring now to FIG. 1, a modular pressure control valve assembly 10 is shown generally. The valve includes a body 12 which contains a plurality of hydraulic fluid passages shown partially at 14. As per conventional practice, some of the passages 14 have enlarged external openings 15 which accommodate O-rings 16 for mating with other compatible hydraulic fluid-carrying members. At least one of the passages 14 is in communication with an annular orifice 18 which communicates directly with a pressure spool valve 22. Typically of pressure control valve assemblies, the control valve 10 includes a plurality of fluid seals 20, whereby pressure differentials may be successfully accommodated within the valve body.

The orifice 18 communicates directly with the pressure spool valve 22, which in turn is retained within a cylindrical valve seat 24. Also interacting with the cylindrical valve seat is a fluid piston 26 which is normally urged thereagainst by a mechanical rather than hydraulic pressure. In the present control valve 10, a pressure relief system is embodied, wherein a spring 32 is utilized to hold the fluid piston 26 normally closed against the valve seat 24.

The force created by the spring 32 is adjustably controlled by an externally threaded valve stem 36 having a spring retention flange 27 at one end thereof. The spring retention flange 27 compresses the spring 32 between the flange and the piston 26 whenever the valve stem is screwed inwardly toward the spring. A housing 30 contains both the spring and the valve stem, the valve stem being additionally supported by a spring retaining plug 34 which is screwed tightly and permanently into the housing 30 during assembly.

In the embodiment shown, a knob 40 is fixed to an operative end of the valve stem 36 by means of a set screw 42, thus enabling the turning of the valve stem by hand as opposed to the less convenient requirement of utilizing a screw driver or other special tool for turning the stem.

An overload pin 28 is juxtapositioned between the piston 26 and the retention flange 27, thus providing overload protection upon the use of the valve in a low pressure hydraulic system. As low pressure systems are sometimes subjected to high pressure shock loads, the fluid piston 26 may occasionally be urged toward the valve stem 36 with such force that damage might occur. The overload pin 28 insures against such possible violent travel of the fluid piston 26.

As earlier stated, the spring retaining plug 34 is permanently threaded into the housing 30 upon assembly of the pressure control valve. A lock nut 38 may be secured against the plug 34 for holding a given pressure setting, as will be appreciated by those skilled in this art. The lock nut may be momentarily loosened and the knob 40 turned for an adjustment of the valve pressure setting.

The invention described and disclosed herein, however, relates primarily to a highest or maximum pressure setting of a manually adjustable valve, and the limiting of valve stem travel to that setting. For this purpose, a stem travel limiting apparatus 44 is positioned on the valve stem 36, and juxtapositioned between the lock nut 38 and the handle or knob 40. Referring to FIG. 1-A, an enlarged cross sectional view of the stem travel limiting apparatus 44 is shown. The apparatus includes an annular collar 46 and a locking ring 48 positioned thereover.

Referring to FIGS. 2 and 3, the collar 46 is shown in greater detail. The collar 46 includes a gap or spacing 50 which extends axially along one side of its annular body. The collar 46 also includes a threaded interior surface 52, the threads of which are preferably designed to mate with the threads of the valve stem 36.

Referring to FIGS. 4 and 5, the locking ring 48 is shown in greater detail. The locking ring 48 includes a beveled portion 54 over an internal unthreaded surface 56 therein, designed to facilitate the positioning of the locking ring 48 over the collar 46. In one preferred embodiment, the bevel has an approximately fifteen degree angle.

It will be appreciated that the locking collar 46 must be secured tightly about the valve stem 36 for establishing a fixed positional relationship thereon. For this purpose, the gap 50 provides for the partial collapse of the locking collar 46 over the valve stem 36 upon the mounting thereover of the locking ring 48. The collar 46 includes an unthreaded external surface 58 for frictionally receiving the internal surface 56 of the locking ring.

The ring 48 is preferably constructed to accomodate an interference fit in the range of twelve to twenty thousandths of an inch between the internal diameter thereof and the external diameter of the collar 46. As the internal diameter of the collar 46 is preferably only two to three thousandths of an inch greater than the diameter of the stem 36, the gap 50 will not completely close, and thus it will be appreciated by those skilled in the art that the locking ring 48 must yield or expand about the collar 46. For this purpose, the locking ring is preferably of a non-heat treated soft steel to permit yielding without breakage. In the preferred practice of this invention, the use of a special tool may be employed to press against the annular rear wall surface 60 of the ring 48 in order to force the latter over the external surface 58 of the collar 46. The resulting apparatus 44 provides a limiting means on the stem 36, wherein the stem cannot be moved into the valve body beyond the point where the apparatus makes contact with the lock nut 38. The locking ring 48 in the preferred embodiment operates to force the mating threads of collar and stem into distortion to insure against any relative movement therebetween.

The stem travel limiting apparatus 44 of the present invention may be applied as follows in order to secure a maximum pressure limit. After assembly of the pressure control valve 10, the valve is placed on a test stand without the knob 40, set screw 42, or the apparatus 44. Hence, the valve stem 36 will extend outwardly from the spring retaining plug 34 for adjustment by means of a slot 62 in the end thereof. The lock nut 38 is loosened and the valve stem 36 is then adjusted on the stand by means of the slot 62 to a desired maximum pressure setting. At this point, the locking collar 46 is screwed over the exposed portion of the valve stem 36 until it makes contact with the lock nut 38. Next, the locking ring 48 is installed, beveled end first, over the collar 46. A special pressure application tool, or hammer and punch, is then employed to force the locking ring 48 over the collar 46 as far as possible, preferably until the locking ring also makes contact with the lock nut 38. Next the knob 40 is inserted over the exposed end of the valve stem 36, and the set screw 42 is installed therein to lock the knob onto the stem. As will be appreciated by those skilled in the art, the knob may be turned in a manner wherein the travel limiting apparatus 44 may move leftwardly or away from the lock nut 38, but cannot be moved rightwardly beyond the position wherein the apparatus 44 comes into contact with the lock nut 38. The lock nut 38 may thereafter be utilized to temporarily lock any given knob setting. When so used, the lock nut 38 must be loosened prior to any change in setting of a pressure.

What is claimed is:

1. In a pressure control valve assembly including a valve housing, a lock nut secured to said housing, an externally threaded valve stem extending through said lock nut, said stem being axially and rotatably movable relative to said lock nut; an improvement comprising a tamper-proof apparatus for limiting axial travel of said externally threaded valve stem, said apparatus comprising:
   (a) an internally threaded annular collar positioned over said externally threaded stem, said collar defining an axially extending unthreaded external surface parallel to said valve stem, said collar comprising a gap in the annular body thereof;
   (b) a yieldable locking ring positioned over said collar, said ring defining an axially extending unthreaded continuous internal surface parallel to said valve stem, said surface sized to form an interference fit with said external surface of said collar, said ring exerting sufficient force over said collar to close said gap, and to force said threaded portions of said stem and collar into distortion, said locking ring comprising a non-heat treated soft steel; and
   (c) said apparatus being axially and rotatably movable with respect to said lock nut of said control valve assembly.

2. The apparatus of claim 1, wherein said collar comprises an unthreaded external surface, and wherein said locking ring comprises a corresponding internally unthreaded surface for mating therewith.

3. The apparatus of claim 2, wherein said locking ring includes an internally beveled portion.

4. A valve assembly including a valve housing, a lock nut secured to said housing, an externally threaded valve stem extending through said lock nut, said stem being axially and rotatably movable relative to said lock nut, and apparatus for limiting axially travel of said externally threaded valve stem comprising:
   (a) an internally threaded annular collar positioned over said externally threaded stem, said collar defining an axially extending unthreaded external surface parallel to said valve stem, said collar comprising a gap in the annular body thereof;
   (b) a yieldable locking ring positioned over the entire external surface of said collar, said ring defining an axially extending unthreaded continuous internal surface parallel to said valve stem, said surface sized to form an interference fit with said external surface of said collar, said ring exerting sufficient force over said collar to close said gap, and to force said threaded portions of said stem and collar into distortion, said locking ring comprising a non-heat treated soft steel; and
   (c) said apparatus being axially and rotatably movable with respect to said lock nut.

* * * * *